(12) United States Patent
Sanville et al.

(10) Patent No.: US 7,392,997 B2
(45) Date of Patent: Jul. 1, 2008

(54) FRONT SUSPENSION STRUT

(75) Inventors: Anthony J. Sanville, Evans, GA (US); Landon N. Ball, North Augusta, SC (US)

(73) Assignee: Textron Inc., Providence, RI (US)

( * ) Notice: Subject to any disclaimer, the term of this patent is extended or adjusted under 35 U.S.C. 154(b) by 215 days.

(21) Appl. No.: 11/420,292

(22) Filed: May 25, 2006

(65) Prior Publication Data
US 2007/0273121 A1 Nov. 29, 2007

(51) Int. Cl.
*B60G 7/00* (2006.01)
(52) U.S. Cl. .............................. 280/124.134; 280/124.1
(58) Field of Classification Search .............. 280/93.51, 280/93.512, 124.125, 124.134, 124.145, 280/124.146, 124.147, 124.164, 124.1
See application file for complete search history.

(56) References Cited

U.S. PATENT DOCUMENTS

| | | | | |
|---|---|---|---|---|
| 4,321,988 A | * | 3/1982 | Bich ...................... 188/321.11 |
| 4,756,517 A | * | 7/1988 | Kakimoto ................... 267/220 |
| 4,821,827 A | | 4/1989 | Reese |
| 4,948,160 A | * | 8/1990 | Barry ..................... 280/86.753 |
| 5,228,717 A | * | 7/1993 | Perkins ................. 280/124.143 |
| 5,372,377 A | * | 12/1994 | Lee ...................... 280/124.143 |
| 5,423,403 A | * | 6/1995 | Handke et al. .......... 188/321.11 |
| 5,782,484 A | * | 7/1998 | Kuhn, Jr. .............. 280/124.142 |
| 5,915,495 A | | 6/1999 | Kerlin et al. |
| 7,017,926 B2 | * | 3/2006 | Lee ...................... 280/124.134 |
| 2003/0234504 A1 | * | 12/2003 | Frantzen ................ 280/93.512 |
| 2005/0212244 A1 | | 9/2005 | Bobbitt et al. |

* cited by examiner

*Primary Examiner*—Ruth Ilan
*Assistant Examiner*—Robert A. Coker
(74) *Attorney, Agent, or Firm*—Harness Dickey & Pierce P.L.C.

(57) ABSTRACT

A golf car suspension system includes a coil-over-shock strut assembly having a shock absorber cylinder and an offset bracket including a semicircular member and bracket legs extending from the semicircular member angularly offset from the semicircular member. The semicircular member engages the shock absorber cylinder. A spacer bracket has a semicircular portion engaging the shock absorber cylinder and opposed sleeve legs received between the bracket legs. A U-shaped knuckle bracket has a web and opposed flanges extending transversely from the web. The bracket legs and the sleeve legs are fixed to the web of the knuckle bracket. A steering knuckle connects to the knuckle bracket flanges. A wheel hub connects to the steering knuckle. A wheel connected to the wheel hub has a side-to-side tread face remaining in contact with a ground surface over a total travel distance of the strut assembly of up to 8.4 cm.

23 Claims, 11 Drawing Sheets

FRONT SUSPENSION STRUT

FIELD

The present disclosure relates to suspension system devices and methods for configuring suspension systems for a golf car or similar vehicle.

BACKGROUND

The statements in this section merely provide background information related to the present disclosure and may not constitute prior art.

Golf cars commonly have rigid or single axle suspension systems for both the front steerable wheels and the rear driving wheels. A solid axle provides a stiffer ride feel for the occupants and can also result in reduced control of the golf car over rough terrain and when turning at higher speeds. Some golf car designs have therefore used an independent suspension system at least for the front steerable wheels which eliminates the solid axle and separately suspends each front steerable wheel from the frame or structure of the golf car.

Drawbacks of existing independent suspension designs for golf cars include a loss of control as the golf car corners rapidly, which tends to lift one or more of the wheels at an angle with respect to a ground surface, reducing wheel contact and therefore steering control. Further drawbacks include limiting the vehicle design to a single wheel size. An improved suspension design is therefore desirable for independent suspensions for golf cars as well as other utility vehicles.

SUMMARY

According to several embodiments for a front suspension strut of the present disclosure, a golf car suspension system includes a coil-over-shock strut assembly including a shock absorber cylinder and an offset bracket. The offset bracket includes a semicircular member and a pair of parallel bracket legs extending outwardly from the semicircular member and angularly offset with respect to the semicircular member. The semicircular member engages the shock absorber cylinder. A U-shaped knuckle bracket includes a web. Each of the bracket legs are fixedly connected to the web of the knuckle bracket.

According to further embodiments, the golf car suspension system also includes a steering knuckle rotatably connected to the flanges of the knuckle bracket. A wheel hub is rotatably connected to the steering knuckle.

According to still other embodiments, a golf car suspension system includes a coil-over-shock strut assembly having a shock absorber cylinder and an offset bracket including a semicircular member and bracket legs extending from the semicircular member angularly offset from the semicircular member. The semicircular member engages the shock absorber cylinder. A spacer bracket has a semicircular portion engaging the shock absorber cylinder and opposed sleeve legs received between the bracket legs. A U-shaped knuckle bracket has a web and opposed flanges extending transversely from the web. The bracket legs and the sleeve legs are fixed to the web of the knuckle bracket. A steering knuckle connects to the knuckle bracket flanges. A wheel hub connects to the steering knuckle. A wheel connected to the wheel hub has a side-to-side tread face remaining in contact with a ground surface over a total travel distance of the strut assembly of up to 8.4 cm.

According to yet still other embodiments, a golf car includes an independent front suspension system. The independent front suspension system includes first and second coil-over-shock strut assemblies each defining an assembly longitudinal axis. U-shaped first and second knuckle brackets each connect to one of the first and second strut assemblies, and each have opposed first and second flanges connected to a web. First and second pin receiving apertures are each created in one of the first and second flanges. The first and second pin receiving apertures are coaxially aligned on an aperture center axis. The aperture center axis is oriented at an angle with respect to the assembly longitudinal axis. A U-shaped second bracket is fixed to the web of each of the first and second knuckle brackets. An A-arm is rotatably connected to each second bracket.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. As referred to herein, the term "golf car" is synonymously used to describe application of the present disclosure to golf cars as well as sport utility vehicles such as modified golf cars, used for example as food and/or beverage cars, golf cars adapted for use as hunting/sporting clays vehicles, golf course maintenance vehicles, and the like.

Figure 1:
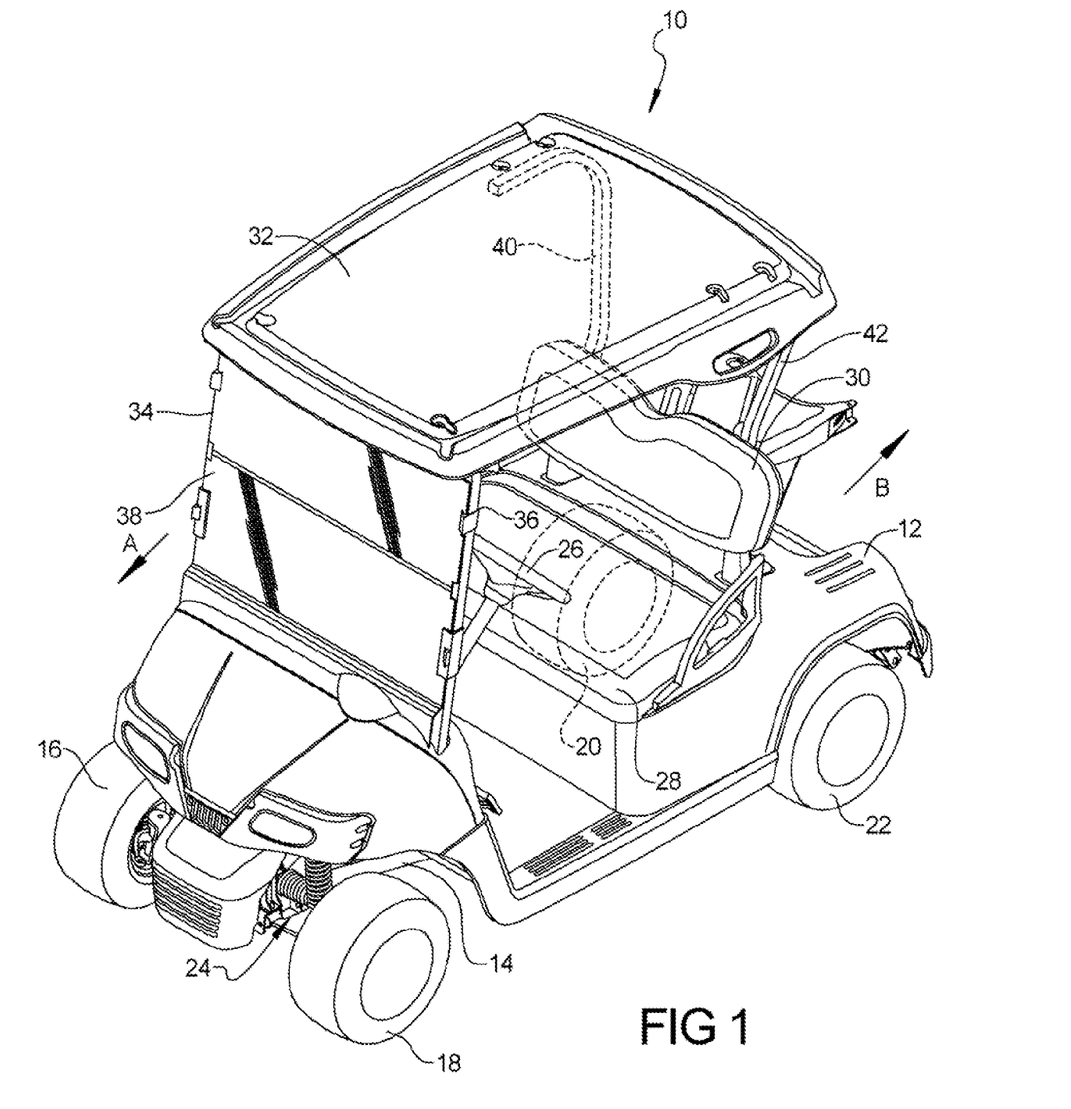
FIG. 1 is a front perspective view of a golf car having a front suspension strut according to various embodiments of the present disclosure.

Referring generally to FIG. 1, a golf car 10 can include a body 12 supported from a structural frame 14. Frame 14 can also support a plurality of wheels including a first steerable wheel 16 and a second steerable wheel 18. In addition, powered or driven wheels including a first driven wheel 20 and a second driven wheel 22 are commonly connected to a rear structural portion of frame 14. A front suspension system 24 can also be provided which is adapted for supporting each of the first and second steerable wheels 16, 18. A steering mechanism 26 which commonly includes a steering wheel and a support post assembly is also included to provide the necessary steering input to first and second steerable wheels 16, 18.

Golf car 10 can also include a passenger bench seat 28 and a passenger back support cushion 30. A cover or roof 32 can also be provided which is supported from either body 12 or frame 14 by first and second roof support members 34, 36. A windscreen or windshield 38 can also be provided which is also supported by each of first and second support members 34, 36. A rear section of roof 32 can be supported by each of a first and a second rear roof support element 40, 42. Other items provided with golf car 10 include golf bag support equipment, accessory racks or bins, headlights, side rails, fenders, and the like.

Golf car 10 is commonly propelled by a power unit such as an engine or battery/motor system which can be positioned below and/or behind bench seat 28. Golf car 10 is capable of motion in either of a forward direction "A" or a rearward direction "B". Each of first and second driven wheels 20, 22 can be commonly supported to frame 14 using multiple designs for a rear suspension system. The present disclosure is therefore not limited by the design of the rear suspension system.

Figure 2:
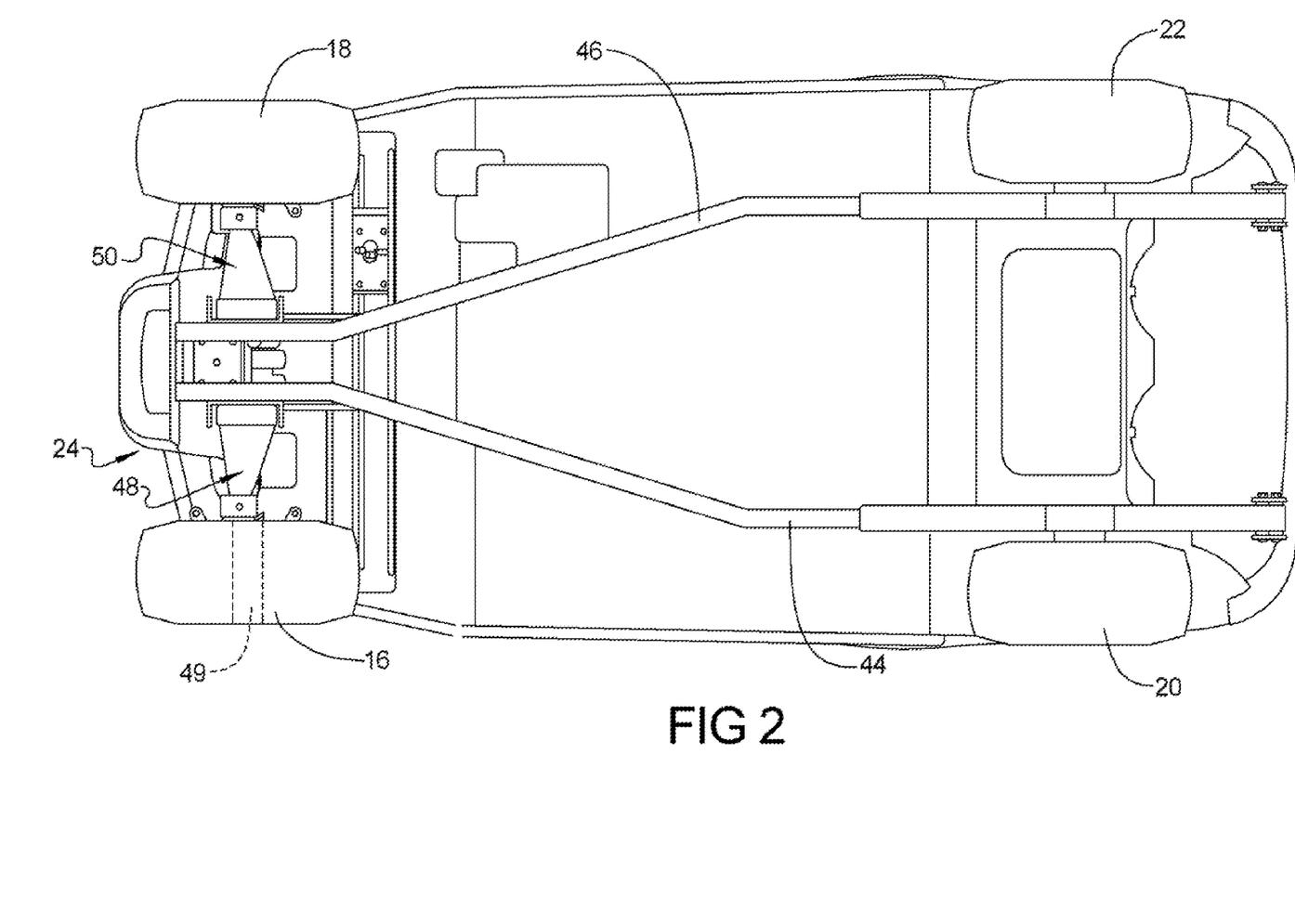
FIG. 2 is a bottom plan view of the golf car of FIG. 1.

As best seen in reference to FIG. 2, frame 14 can further include a substantially longitudinally arranged first frame member 44 and a mirror image arranged second frame member 46. First and second frame members 44, 46 can be hollow, tubular shaped members created of a metal such as a steel material or similar structural material and formed by welding, extruding, hydroforming, or similar processes. Front suspension system 24 can include each of a first front suspension subassembly 48 supporting first steerable wheel 16 and a second front suspension subassembly 50 supporting second steerable wheel 18.

Front suspension system 24 is configured to permit an extended travel of first and second front suspension subassemblies 48, 50 to provide a comfortable ride and to permit installation of wheels of differing diameters. The extended travel during rotation of first and second front suspension subassemblies 48, 50 with respect to frame 14 permits a total travel of approximately 8.4 cm (3.3 in) while maintaining a side-to-side tread face 49 of at least first and second steerable wheels 16, 18 substantially in contact with a ground surface throughout the total travel.

Figure 3:
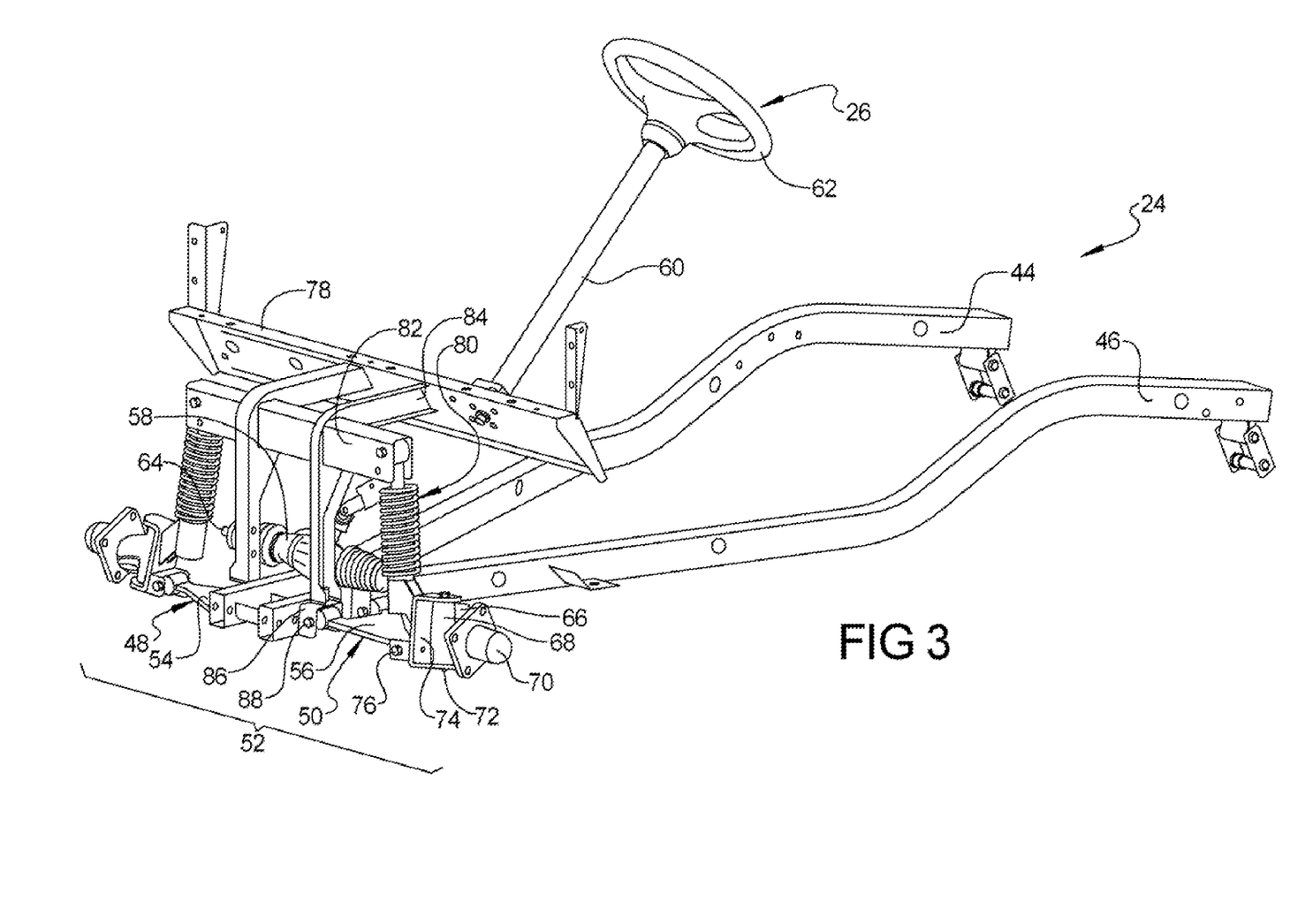
FIG. 3 is a front perspective view of a golf car frame and steering assembly together with the double wishbone front suspension of the present disclosure.

Referring now generally to FIG. 3, first and second front suspension subassemblies 48, 50 together define an independent suspension system 52. Independent suspension system 52 can include a first A-arm 54 and a second A-arm 56. Each of first and second A-arms 54, 56 are identical A-arms which are reversibly disposed in each of the first and second front suspension subassemblies 48, 50. Because each of the first and second front suspension subassemblies 48, 50 are substantially mirror image configurations of each other, only the left hand or second front suspension subassembly 50 will be further discussed herein.

A steering gear 58 coupled to a steering column 60 receives a manual turning force from a steering wheel 62. At least one bellows 64 protects exposed portions of steering mechanism 26 associated with steering gear 58. From steering gear 58, a steering arm 66 can connect to a steering knuckle 68, which is connected to a wheel hub 70 to which second steerable wheel 18 is mounted. Steering knuckle 68 is supported to permit steering of second steerable wheel 18 by a knuckle pin 72 to a knuckle bracket 74. Knuckle bracket 74 can be rotatably coupled to second A-arm 56 to allow upward and downward travel of second steerable wheel 18 using a fastener/pin 76. In addition to the connection provided to second frame member 46 by second A-arm 56, steering knuckle 68 and knuckle bracket 74 can be also connected to a steering support structure 78 using a coil-over-shock strut assembly 80. Coil-over-shock strut assembly 80 is connected to support structure 78 via a support arm 82 fixedly connected to a structural member 84. Both structural member 84 and second A-arm 56 can be further connected to second frame member 46 using a U-shaped member 86 fixedly connected such as by welding to second frame member 46. A fastener/pin 88 rotatably connects an inboard end of second A-arm 56 to U-shaped member 86.

Figure 4:
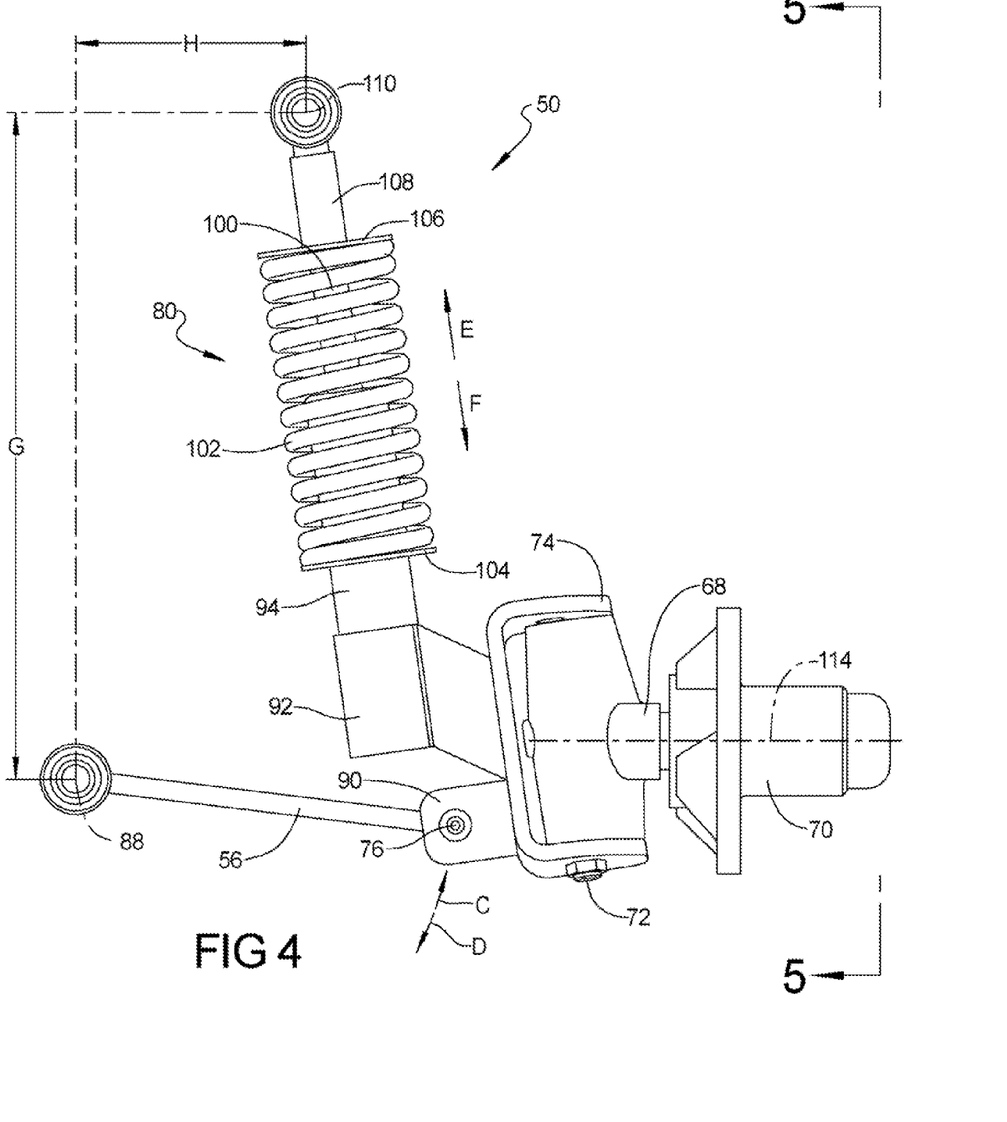
FIG. 4 is a front elevational view of a front suspension subassembly of the present disclosure.
Figure 5:
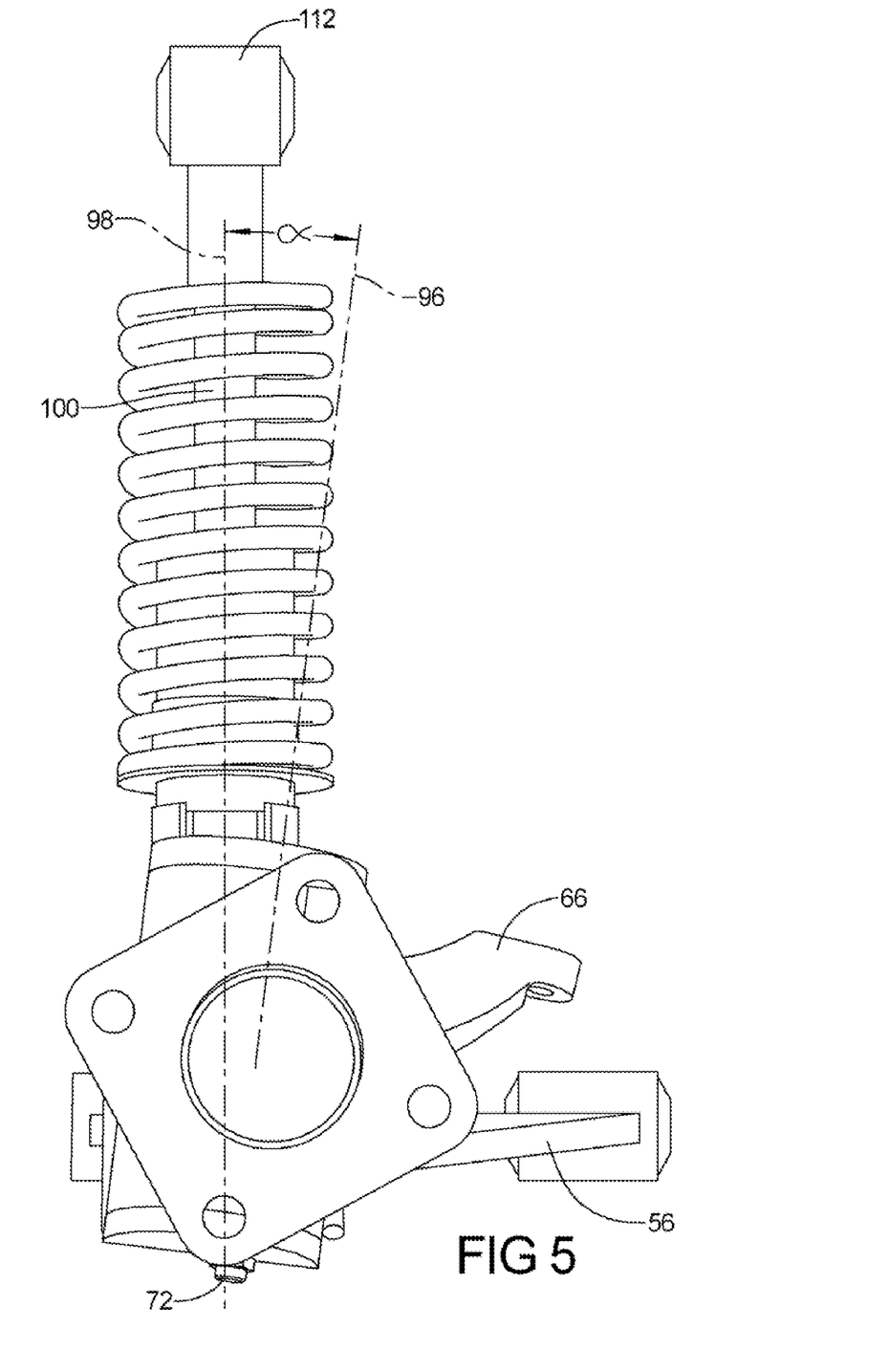
FIG. 5 is a side elevational view of the front suspension subassembly of FIG. 4.

Referring now more specifically to FIGS. 4 and 5, second front suspension subassembly 50 further includes a substantially U-shaped second bracket 90 fixedly connected to knuckle bracket 74. Second bracket 90 includes opposed flanged arms which receive fastener/pin 76 to rotatably connect second A-arm 56. An offset bracket 92 is also fixedly connected to knuckle bracket 74 which receives a cylinder end 94 of coil-over-shock strut assembly 80. A knuckle longitudinal axis 96 defined through steering knuckle 68 and knuckle pin 72 is offset from a shock assembly longitudinal axis 98 defined through a piston rod 100 of coil-over-shock strut assembly 80 by an angle α, which in several embodiments is approximately 6°.

Coil-over-shock strut assembly 80 includes at least offset bracket 92, cylinder end 94, piston rod 100, a biasing element 102 such as a helical or coiled spring retained between a first spring plate 104 fixed to cylinder end 94, and a second spring plate 106 fixed to a tubular member 108 through which piston rod 100 is slidably disposed. A fastener 110 such as a pin disposed in a sleeve 112 of coil-over-shock strut assembly 80 connects coil-over-shock strut assembly 80 to support arm 82.

Second steerable wheel 18 connected to wheel hub 70 initially define a horizontal axis 114 which maximizes tread face 49 of second steerable wheel 18 in contact with a ground surface. As second steerable wheel 18 displaces, it is desirable to maintain the axis of wheel hub 70 substantially on horizontal axis 114. To accomplish this, second A-arm 56 rotates about an axis of fastener/pin 88 in either a first or second arc of rotation "C" or "D" as second bracket 90 is allowed to rotate about fastener/pin 76. Because the longitudinal axis of fastener 110 fixes the position of sleeve 112 relative to support arm 82, as second A-arm 56 deflects about first arc of rotation "C", biasing element 102 compresses in a compression direction "E". Similarly, as second A-arm 56 deflects about second arc of rotation "D", biasing element 102 expands in an expansion direction "F". First and second positioning dimensions "G" and "H" and a length of second A-arm 56 are predetermined to maintain the longitudinal axis of wheel hub 70 substantially on horizontal axis 114 throughout a range of motion in compression direction "E" and expansion direction "F" of first spring plate 104 with respect to second spring plate 106.

Figure 6:
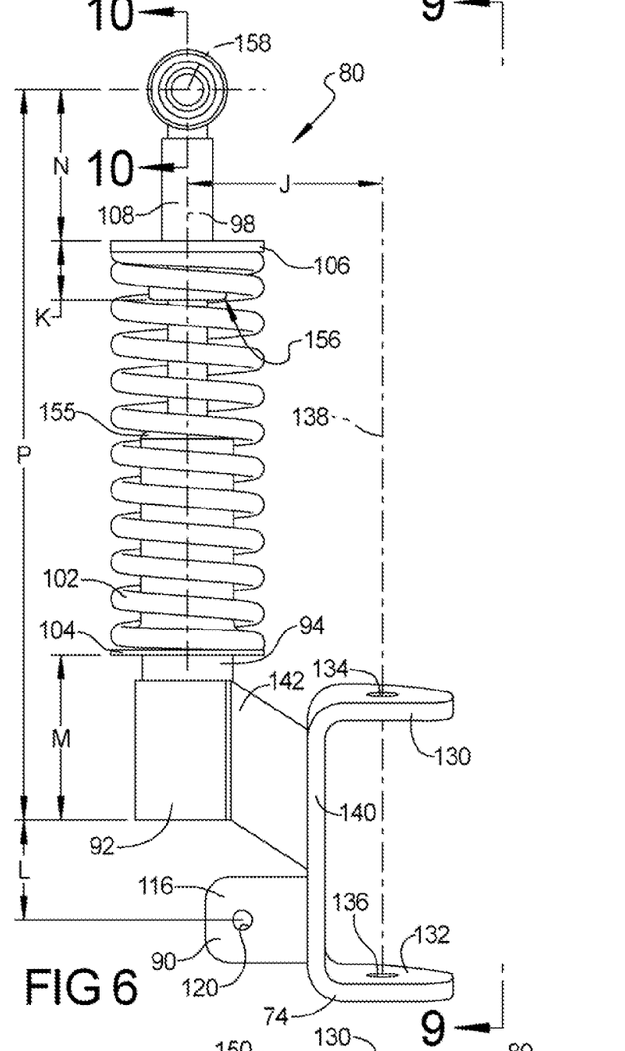
FIG. 6 is a rear elevational view of a front suspension strut assembly of the present disclosure.
Figure 7:
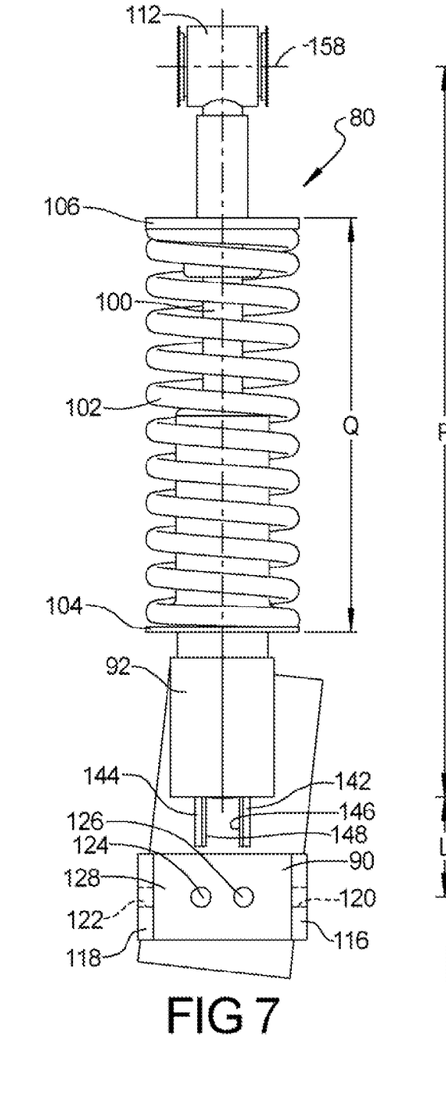
FIG. 7 is a first side elevational view of the front suspension strut assembly of FIG. 6.
Figure 8:
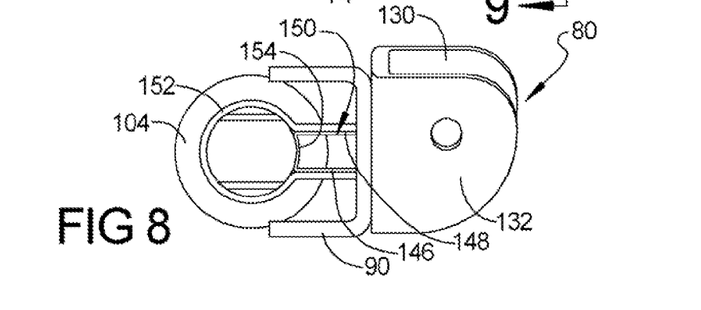
FIG. 8 is a bottom plan view of the front suspension strut assembly of FIG. 6.

Referring generally to FIGS. 6 through 8, second bracket 90 includes a first side flange 116 and a second side flange 118. A first through aperture 120 is created in first side flange 116 and a second through aperture 122 is created through second side flange 118. The first and second through apertures 120, 122 are co-axially aligned to receive fastener/pin 76. First and second alignment apertures 124, 126 are created in a web 128 of second bracket 90 which can receive fasteners for mounting second bracket 90 on knuckle bracket 74. Knuckle bracket 74 includes first and second flanges or ends 130, 132 having first and second pin receiving apertures 134, 136 respectively, which are coaxially aligned on an aperture center axis 138 to receive knuckle pin 72. Aperture center axis 138 is positioned at a distance "J" from shock absorber longitudinal axis 98. Knuckle bracket 74 also includes a bracket web 140 joining first and second ends 130, 132. Offset bracket 92 includes a pair of substantially parallel first and second bracket legs 142, 144 which in several embodiments are fixed such as by welding to bracket web 140 of knuckle bracket 74. Coil-over-shock strut assembly 80 further includes a substantially parallel pair of first and second sleeve legs 146, 148 of a spacer bracket 150 which are received within and each abutted with corresponding ones of the first and second bracket legs 142, 144. First and second sleeve legs 146, 148 can also be fixed such as by welding to knuckle bracket 74. As best seen in FIG. 8, cylinder end 94 of coil-over-shock strut assembly 80 is received within a cavity defined by a semi-circular portion 152 of offset bracket 92 and a semi-circular end 154 of spacer bracket 150.

Cylinder end 94 further includes a bushing 155 having a polymeric coating to promote sliding motion of a first end of piston rod 100. The polymeric coating can be for example polytetraflouroethylene. Bushing 155 also helps absorb transverse shock loads received for example if one of the wheels strikes an object such as a curb or tree limb. Tubular member 108 slidably receives a second end of piston rod 100. An end face 156 of tubular member 108 is spaced from second spring plate 106 by a dimension "K". Dimensions of coil-over-shock strut assembly 80 also include a spacing dimension "L" between a center axis of first through aperture 120 and a lower end of offset bracket 92, a distance "M" between the lower end of offset bracket 92 and first spring plate 104, a distance "N" between a sleeve longitudinal axis 158 of sleeve 112 and second spring plate 106, and a variable distance "P" between the lower end of offset bracket 92 and the sleeve longitudinal axis 158. Variable distance "P", together with a similar spacing dimension "Q" defined between first and second spring plates 104, 106 will vary upon displacement of sleeve 112 with respect to first spring plate 104. In several embodiments, the difference between a minimum value to a maximum value of variable distance "P", which is also defined as the total travel of coil-over-shock strut assembly 80, is approximately 8.41 cm (3.31 in). In several embodiments, a 120 lb/in stiffness rate is selected for biasing element 102 as well as a 43.09 Kg (95 lb) preload in a biasing element unloaded state.

Figures 9, 10:
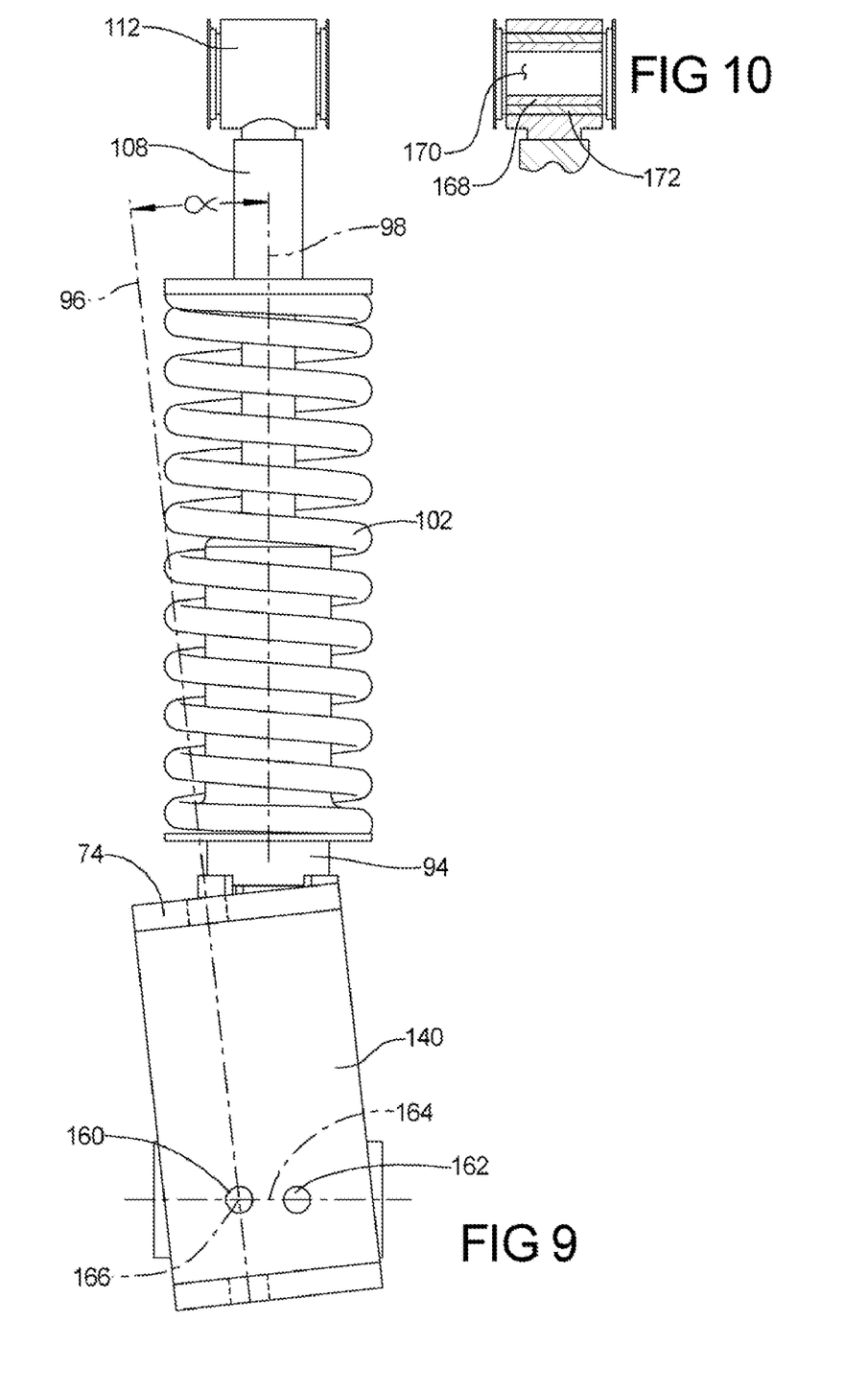
FIG. 9 is a second side elevational view of the front suspension strut assembly of FIG. 6.
FIG. 10 is a cross sectional view taken at section 10-10 of FIG. 6.

Referring now to FIGS. 9 and 10 a pair of apertures 160, 162 created in bracket web 140 of knuckle bracket 74, are coaxially aligned on a first common axis 164 which can be perpendicularly oriented with respect to longitudinal axis 98. Apertures 160, 162 can be used to mount second bracket 90. Aperture 160 is also positioned having longitudinal axis 96 intersecting its aperture centerline 166. Sleeve 112 is provided with an internally positioned bearing sleeve 168 defining a through bore 170 used to fasten sleeve 112 to body structure of golf car 10. A resilient material bushing 172 can also be positioned about the bearing sleeve 168.

Figure 11:
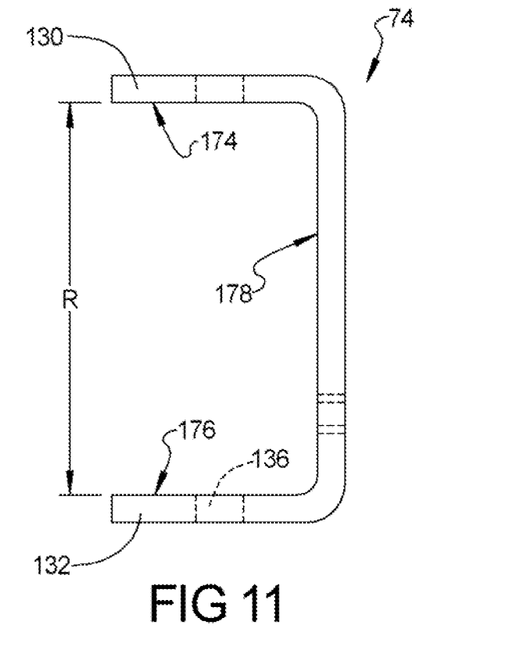
FIG. 11 is a side elevational view of a knuckle bracket of the present disclosure.
Figure 12:
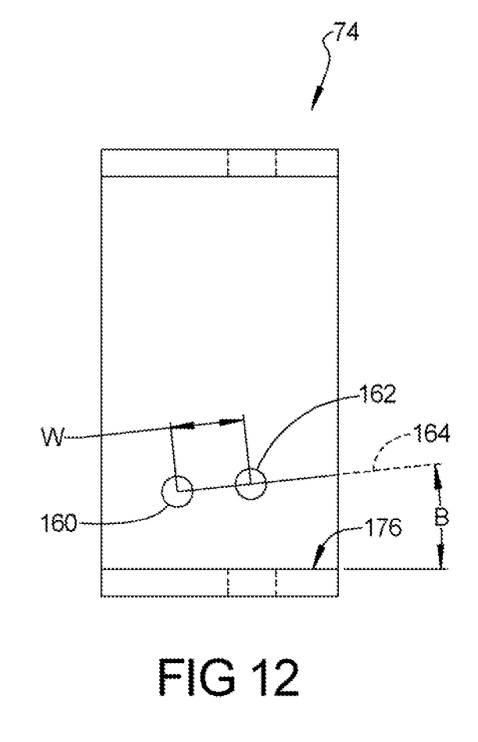
FIG. 12 is a front elevational view of the knuckle bracket of FIG. 11.
Figure 13:
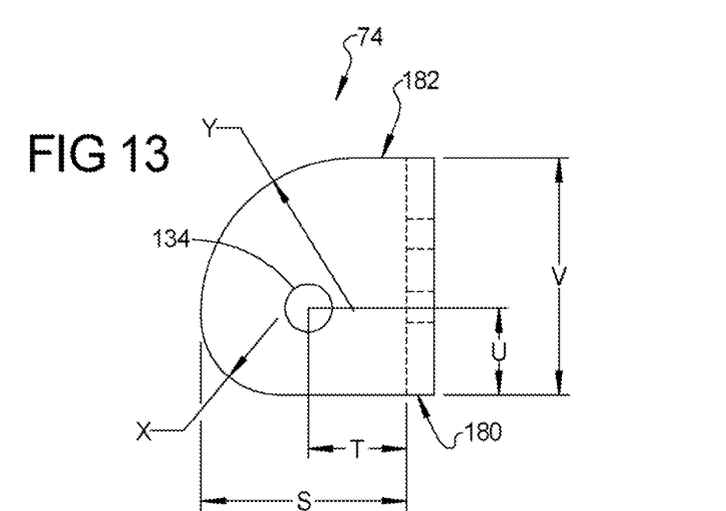
FIG. 13 is an end elevational view of the knuckle bracket of FIG. 11.

Referring now to FIGS. 11 through 13, knuckle bracket 74 further includes a separation distance "R" between a first inner face 174 of first end 130 and a second inner face 176 of second end 132. Each of first and second ends 130, 132 extend away from a web inner face 178 by a dimension "S". Each of first and second pin receiving apertures 134, 136 are spaced from web inner face 178 by a dimension "T" and from a bracket edge 180 by a dimension "U" within a total bracket width "V". First and second apertures 160, 162 are separated by a dimension "W" and first common axis 164 defines an angle β with respect to second inner face 176. Each of first and second ends 130, 132 include a first radius "X" created proximate to bracket edge 180 and a second radius "Y" created proximate a second bracket edge 182. According to several embodiments, separation distance "R" is approximately 111.3 mm, dimension "S" is approximately 58.2 mm, dimension "T" is approximately 28.2 mm, dimension "U" is approximately 24 mm, dimension "V" is approximately 67 mm, dimension "W" is approximately 20 mm, first radius "X" is approximately 20 mm, second radius "Y" is approximately 43 mm, and angle β is approximately 6°.

Figure 14:
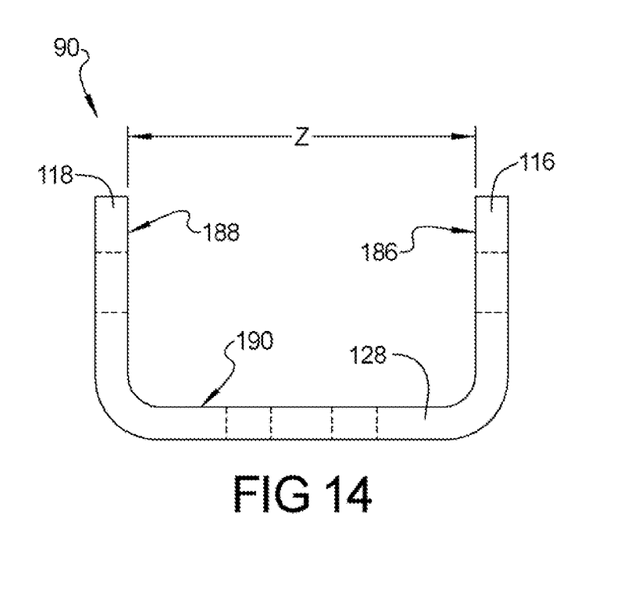
FIG. 14 is a side elevational view of a U-shaped bracket of the present disclosure.
Figure 15:
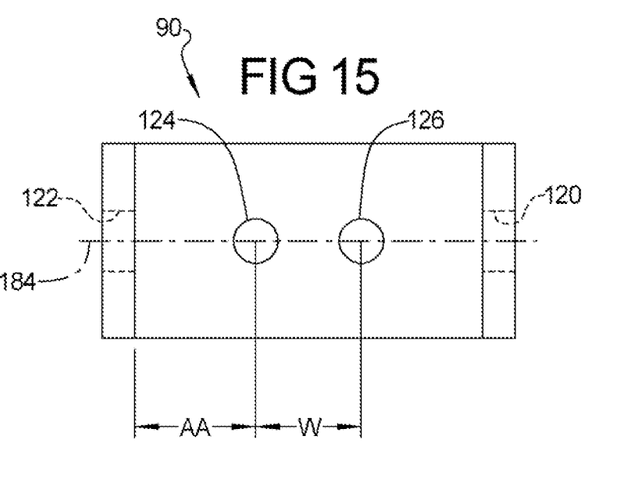
FIG. 15 is a front elevational view of the U-shaped bracket of FIG. 14.
Figure 16:
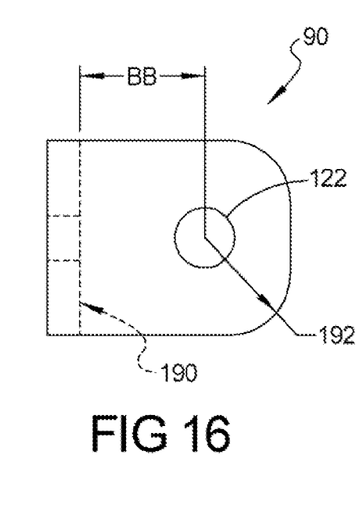
FIG. 16 is an end elevational view of the U-shaped bracket of FIG. 14.

Referring now to FIGS. 14 through 16, to align first and second alignment apertures 124, 126 with first and second apertures 160, 162 of knuckle bracket 74, first and second alignment apertures 124, 126 are spaced by dimension "W" from each other and coaxially aligned on a second common axis 184. In several embodiments, when second bracket 90 is connected to knuckle bracket 74, second common axis 184 is oriented substantially perpendicular to assembly longitudinal axis 98. First and second side flanges 116, 118 have first and second flange inner faces 186, 188 which are spaced from each other by a dimension "Z", further defining a dimension "AA" from second flange inner face 188 to first alignment aperture 124. Each of first and second through apertures 120, 122 are spaced from an inner web face 190 of web 128 by a dimension "BB". Each of first and second side flanges 116, 118 include opposed radii 192. According to several embodiments, dimension "Z" is approximately 64 mm, dimension "AA" is approximately 21.5 mm, dimension "BB" is approximately 22.1 mm, and radii 192 are approximately 12 mm.

Figure 17:
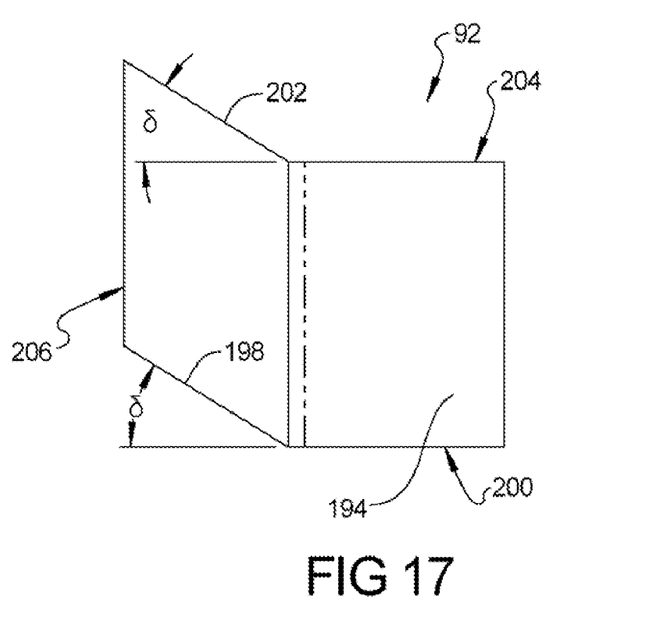
FIG. 17 is a side elevational view of an offset bracket of the present disclosure.
Figure 18:
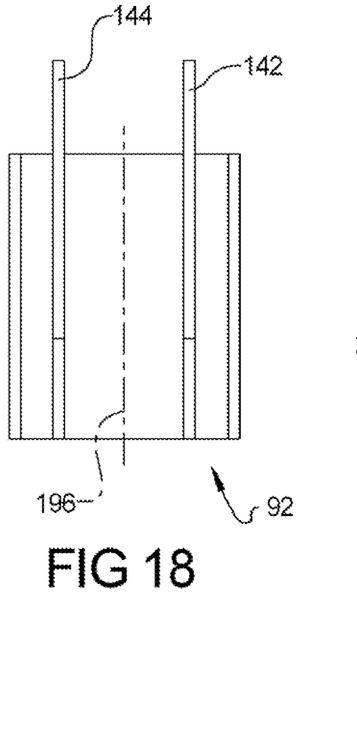
FIG. 18 is a front elevational view of the offset bracket of FIG. 17.
Figure 19:
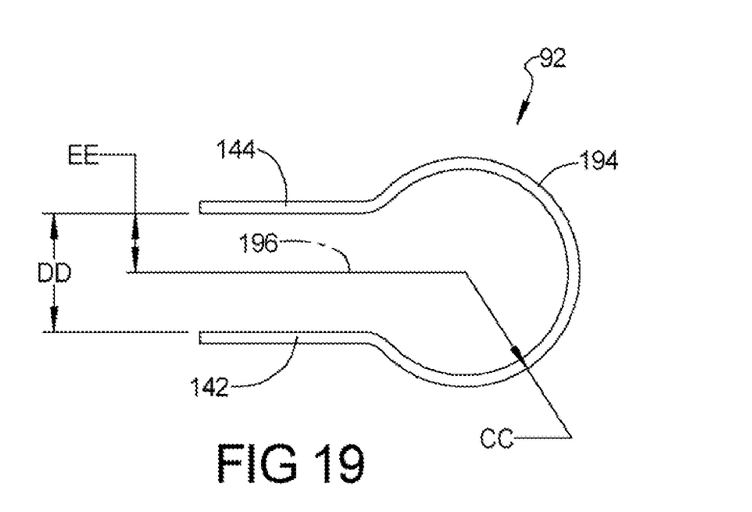
FIG. 19 is an end elevational view of the offset bracket of FIG. 17.

Referring now to FIGS. 17 through 19, offset bracket 92 further includes semi-circular member 194 having a radius "CC" and a leg axis 196. Radius "CC" substantially equals the radius of cylinder end 94 of coil-over-shock assembly 80 to allow semi-circular member 194 to engage cylinder end 94. First and second bracket legs 142, 144 are spaced apart from each other by a dimension "DD" and each are separated from leg axis 196 by a dimension "EE". Each of first and second bracket legs 142, 144 have a first leg edge 198 which is angularly oriented with respect to a lower end 200 of semi-circular member 194 by an angle δ. Similarly, each of first and second bracket legs 142, 144 have a second leg edge 202 which is angularly oriented with respect to an upper end 204 of semi-circular member 194 by angle δ. A leg end 206 of each of first and second bracket legs 142, 144 is fixed, for example by welding, to bracket web 140 of knuckle bracket 74. According to several embodiments, dimension "DD" is approximately 25 mm, dimension "EE" is approximately 12.5 mm, radius "CC" is approximately 21 mm, and angle δ is approximately 32°.

Figure 20:
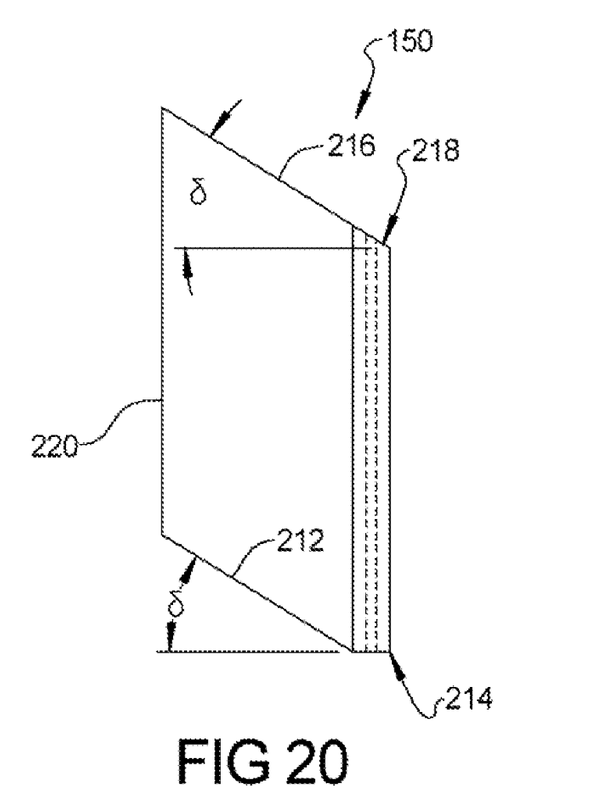
FIG. 20 is a side elevational view of a spacer bracket of the present disclosure.
Figure 21:
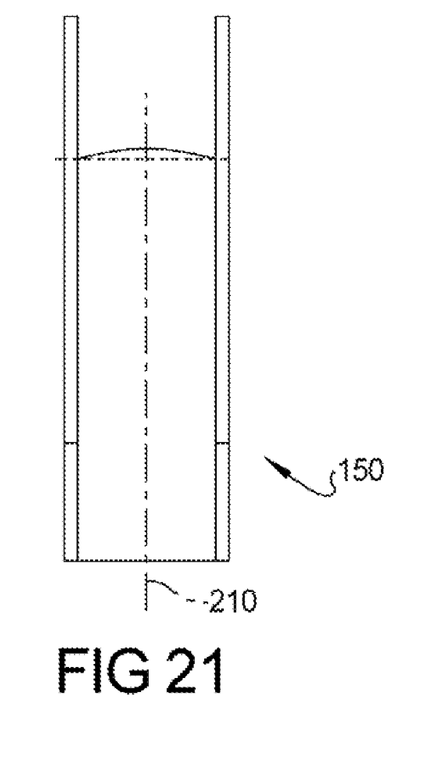
FIG. 21 is an front elevational view of the spacer bracket of FIG. 20.
Figure 22:
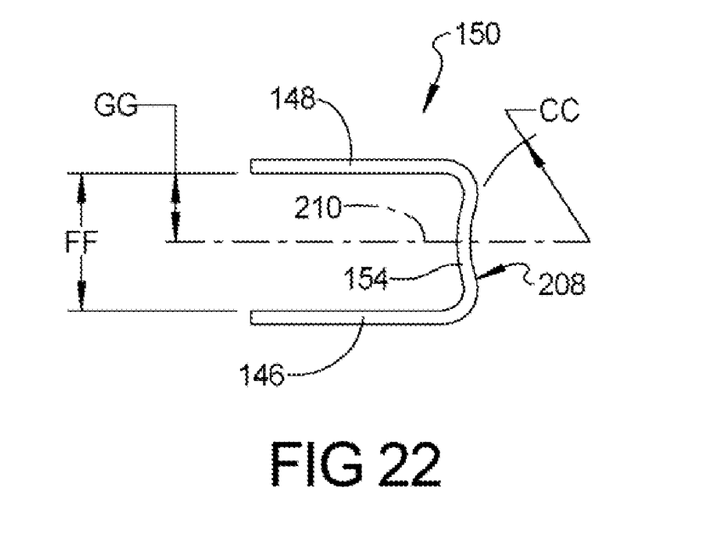
FIG. 22 is an end elevational view of the spacer bracket of FIG. 20.

Referring now to FIGS. 20 through 22, spacer bracket 150 further includes semi-circular end wall 208 of semi-circular end 154 having radius "CC" and a leg axis 210. First and second sleeve legs 146, 148 are spaced apart from each other by a dimension "FF" which is smaller than dimension "DD" separating first and second bracket legs 142, 144 to permit first and second sleeve legs 146, 148 to be slidably received between first and second bracket legs 142, 144. Each of first and second sleeve legs 146, 148 are separated from leg axis 210 by a dimension "GG". Each of first and second sleeve legs 146, 148 have a first sleeve edge 212 which is angularly oriented with respect to a lower edge 214 of semi-circular end wall 208 by angle δ. Similarly, each of first and second sleeve legs 146, 148 have a second sleeve edge 216 which is angularly oriented with respect to an upper edge 218 of semi-circular end wall 208 by angle δ. A sleeve end 220 of each of first and second sleeve legs 146, 148 is fixed, for example by welding, to bracket web 140 of knuckle bracket 74.

What is claimed is:

1. A golf car suspension system, comprising:
a coil-over-shock strut assembly including:
   a shock absorber cylinder;
   an offset bracket including a semicircular member and a pair of substantially parallel bracket legs extending outwardly from the semicircular member and angularly offset with respect to the semicircular member, the semicircular member adapted to engage the shock absorber cylinder;
a substantially U-shaped knuckle bracket having a web;
wherein each of the bracket legs are fixedly connected to the web of the knuckle bracket.

2. The suspension system of claim 1, wherein the coil-over-shock assembly further comprises:
a first spring plate fixedly connected to the shock absorber cylinder;
a piston rod having a first end slidably received within the shock absorber cylinder;
a tubular member slidably receiving a second end of the piston rod;
a second spring plate fixedly connected to the tubular member; and
a biasing element disposed between and in contact with the first and second spring plates.

3. The suspension system of claim 2, wherein the biasing element further comprises a coiled spring having a 120 lb/in stiffness rate and a preset 95 lb preload in a biasing element unloaded state.

4. The suspension system of claim 2, wherein the piston rod has a total travel with respect to the shock absorber cylinder of up to 8.4 cm.

5. The suspension system of claim 2, further comprising a bearing disposed within the shock absorber cylinder adapted to slidably receive the first end of the piston rod, wherein the bearing further comprises a polymeric material coating.

6. The suspension system of claim 1, wherein the knuckle bracket further comprises:
opposed first and second ends extending from the web substantially transverse to the web;
first and second pin receiving apertures each created in one of the first and second ends;
an axis centrally defined through the first and second pin receiving apertures, the axis oriented at an angle with respect to a longitudinal axis of the coil-over-shock assembly.

7. The suspension system of claim 6, wherein the angle comprises 6 degrees.

8. The suspension system of claim 1, further comprising a substantially U-shaped second bracket fixed to the knuckle bracket and adapted to rotatably receive an A-arm.

9. The suspension system of claim 1, further comprising a spacer bracket having a semicircular portion adapted to engage the shock absorber cylinder and an opposed pair of sleeve legs adapted to be received between the bracket legs of the offset bracket, wherein each of the sleeve legs are fixedly connected to the web of the knuckle bracket.

10. A golf car suspension system, comprising:
a coil-over-shock strut assembly including:
   a shock absorber cylinder;
   an offset bracket including a semicircular member and a pair of substantially parallel bracket legs extending outwardly from the semicircular member and angularly offset with respect to the semicircular member, the semicircular member adapted to engage the shock absorber cylinder;
a substantially U-shaped knuckle bracket having a web and opposed flanges extending transversely from the web, wherein each of the bracket legs are fixedly connected to the web of the knuckle bracket;
a steering knuckle rotatably connected to the flanges of the knuckle bracket; and
a wheel hub rotatably connected to the steering knuckle.

11. The suspension system of claim 10, further comprising a substantially U-shaped second clamp fixedly connected to the web of the knuckle bracket.

12. The suspension system of claim 11, further comprising:
a frame structure adapted to support the strut assembly; and
an A-arm rotatably connected to both the second clamp and the frame structure.

13. The suspension system of claim 10, further comprising a wheel connected to the wheel hub, a side-to-side tread face of the wheel remaining substantially in contact with a ground surface over a total travel of the strut assembly of up to 8.4 cm.

14. The suspension system of claim 10, further comprising:
a biasing element of the strut assembly;
wherein the biasing element defines a coiled spring having a 120 lb/in stiffness rate and a preset 95 lb preload in a spring unloaded state.

15. A golf car suspension system, comprising:
a coil-over-shock strut assembly including:
   a shock absorber cylinder;
   an offset bracket including a semicircular member and a pair of substantially parallel bracket legs extending outwardly from the semicircular member and angularly offset with respect to the semicircular member, the semicircular member adapted to engage the shock absorber cylinder; and
   a spacer bracket having a semicircular portion adapted to engage the shock absorber cylinder and an opposed pair of sleeve legs adapted to be received between the bracket legs of the offset bracket;
a substantially U-shaped knuckle bracket having a web and opposed flanges extending transversely from the web, wherein each of the bracket legs and the sleeve legs are fixedly connected to the web of the knuckle bracket;
a steering knuckle rotatably connected to the flanges of the knuckle bracket;

a wheel hub rotatably connected to the steering knuckle; and a wheel connected to the wheel hub, a side-to-side tread face of the wheel remaining substantially in contact with a ground surface over a total travel distance of the strut assembly of up to 8.4 cm.

16. The suspension system of claim 15, wherein the coil-over-shock assembly further comprises:

a first spring plate fixedly connected to the shock absorber cylinder;

a piston rod having a first end slidably received within the shock absorber cylinder;

a tubular member slidably receiving a second end of the piston rod;

a second spring plate fixedly connected to the tubular member; and a biasing element disposed between and in contact with the first and second spring plates.

17. The suspension system of claim 16, wherein the biasing element defines a coiled spring having a 120 lb/in stiffness rate and a preset 95 lb preload in a spring unloaded state.

18. A golf car, comprising:

an independent front suspension system, including:

first and second coil-over-shock strut assemblies each defining an assembly longitudinal axis;

U-shaped first and second knuckle brackets each connected to one of the first and second strut assemblies, and each having opposed first and second flanges connected to a web;

first and second pin receiving apertures each created in one of the first and second flanges, the first and second pin receiving apertures coaxially aligned on an aperture center axis, the aperture center axis being oriented at an angle with respect to the assembly longitudinal axis;

a U-shaped second bracket fixedly connected to the web of each of the first and second knuckle brackets; and an A-arm rotatably connected to each second bracket.

19. The golf car of claim 18, wherein the first and second coil-over-shock strut assemblies each further comprise:

a shock absorber cylinder; and an offset bracket including a semicircular member and a pair of substantially parallel bracket legs extending outwardly from the semicircular member and angularly offset with respect to the semicircular member, the semicircular member adapted to engage the shock absorber cylinder;

wherein each of the bracket legs are fixedly connected to the web of the knuckle bracket.

20. The golf car of claim 19, further comprising a spacer bracket having a semicircular portion adapted to engage the shock absorber cylinder and an opposed pair of sleeve legs adapted to be received between the bracket legs of the offset bracket, wherein each of the sleeve legs are fixedly connected to the web of the knuckle bracket.

21. The golf car of claim 18, further comprising:

first and second apertures created in each of the first and second knuckle brackets, the first and second apertures positioned on a first common axis; and first and second fastener alignment apertures created in the second bracket on a second common axis, the first fastener alignment aperture coaxially alignable with the first aperture, and the second fastener alignment aperture coaxially alignable with the second aperture.

22. The golf car of claim 21, wherein the angle defined between the aperture center axis and the assembly longitudinal axis is substantially 6 degrees, the first common axis is oriented substantially perpendicular to the aperture center axis, and the second common axis is oriented substantially perpendicular to the assembly longitudinal axis.

23. The golf car of claim 18, further comprising:

a wheel hub rotatably connected to each of the first and second knuckle brackets;

a wheel connected to each wheel hub; and a side-to-side tread face of each wheel remaining substantially in contact with a ground surface over a total travel distance of each strut assembly of up to 8.4 cm.

* * * * *